Oct. 12, 1954   J. A. C. YULE ET AL   2,691,586
PHOTOGRAPHIC LIGHT-SENSITIVE MATERIAL FOR MAKING HALFTONES
Filed June 4, 1952   5 Sheets-Sheet 1

John A.C.Yule
Richard E.Maurer
Daniel I. Mayne
INVENTORS
BY F.W. Emerson Holmes
ATTORNEYS Oct. 12, 1954   J. A. C. YULE ET AL   2,691,586
PHOTOGRAPHIC LIGHT-SENSITIVE MATERIAL FOR MAKING HALFTONES
Filed June 4, 1952   5 Sheets-Sheet 2

John A.C. Yule
Richard E. Maurer
INVENTORS
Daniel S. Mayne
BY J. M. Emerson Holmes
ATTORNEYS Oct. 12, 1954  J. A. C. YULE ET AL  2,691,586
PHOTOGRAPHIC LIGHT-SENSITIVE MATERIAL FOR MAKING HALFTONES
Filed June 4, 1952  5 Sheets-Sheet 3
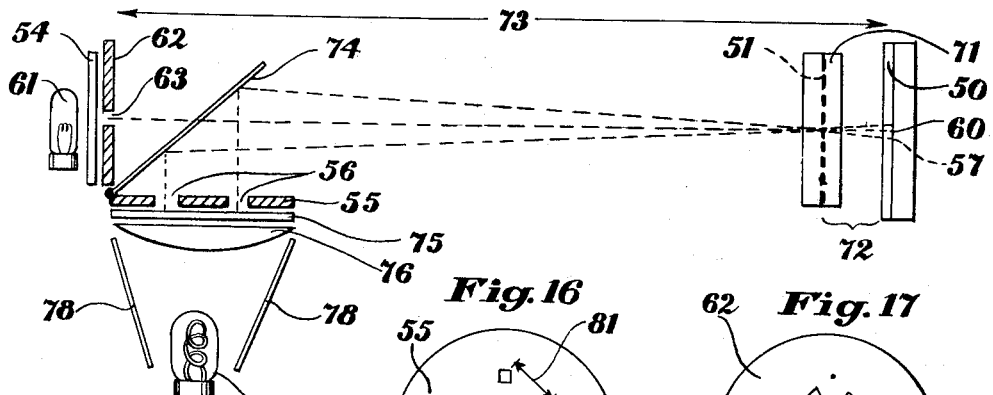
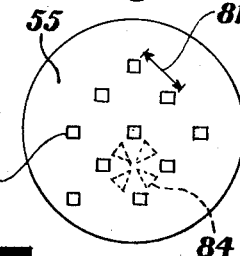
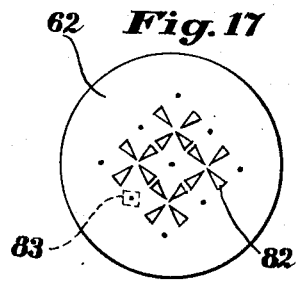
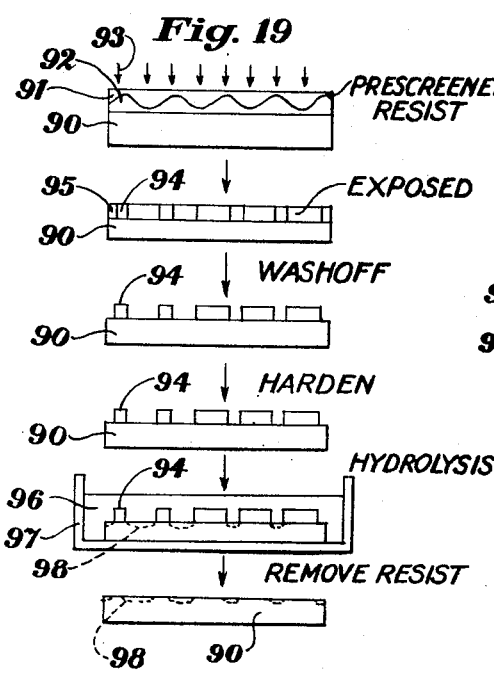
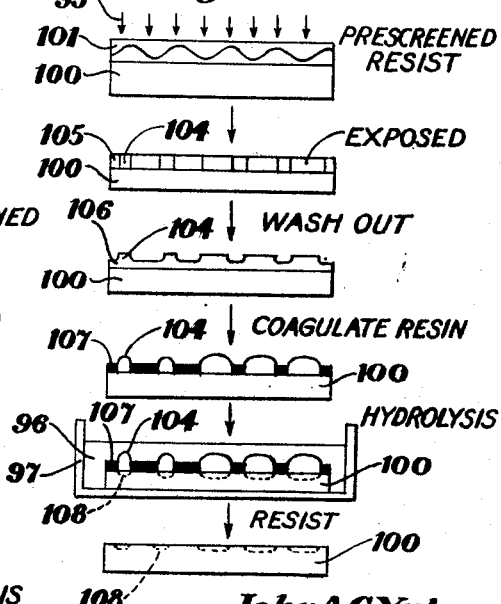
John A. C. Yule
Richard E. Maurer
INVENTORS
ATTORNEYS Oct. 12, 1954      J. A. C. YULE ET AL      2,691,586
PHOTOGRAPHIC LIGHT-SENSITIVE MATERIAL FOR MAKING HALFTONES
Filed June 4, 1952      5 Sheets-Sheet 5
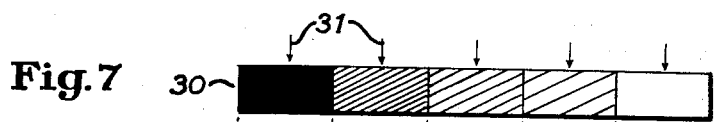
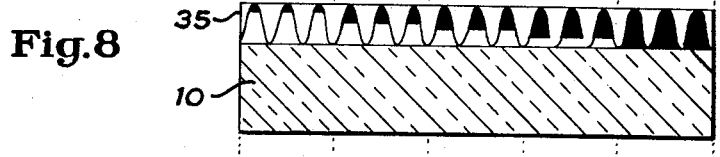
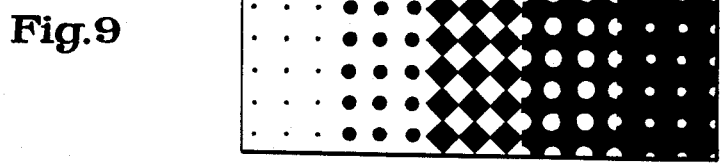
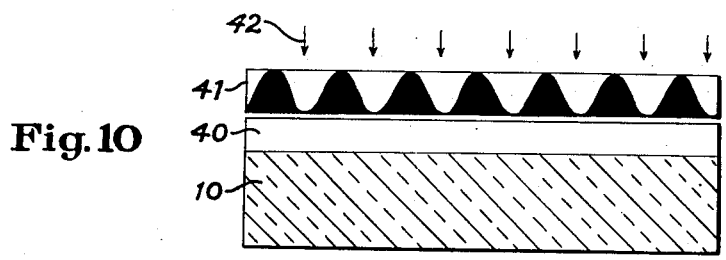
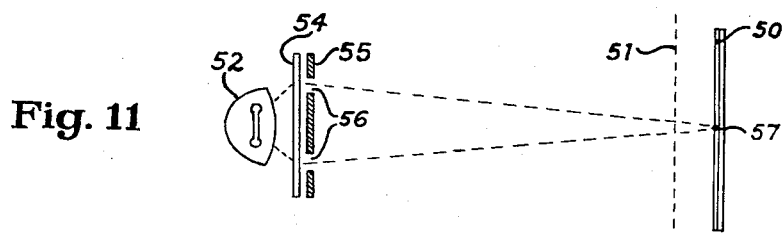
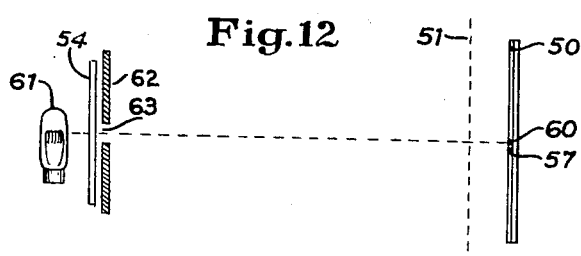
John A.C. Yule
Richard E. Maurer
INVENTORS
ATTORNEYS Patented Oct. 12, 1954

2,691,586

UNITED STATES PATENT OFFICE 2,691,586

PHOTOGRAPHIC LIGHT-SENSITIVE MATERIAL FOR MAKING HALFTONES

John A. C. Yule and Richard E. Maurer, Rochester, N. Y., assignors to Eastman Kodak Company, Rochester, N. Y., a corporation of New Jersey Application June 4, 1952, Serial No. 291,623

23 Claims. (Cl. 95—8)

This application is a continuation-in-part of our application Serial No. 168,718, filed June 17, 1950 and now abandoned. Reference is also made to two other continuations-in-part, Serial Nos. 291,621 and 291,622 thereof filed concurrently with this one.

This invention relates to photomechanical reproduction processes and particularly to photographic material for the making of halftone negatives or positives.

It is the object of the invention to provide a material for making halftone records directly, without the use of a separate screen of the ruled or contact type. That is, it is the object of the invention to provide a prescreened photographic material and a method of making it.

Others have attempted to provide sensitive material with a built-in screen. Perhaps the most successful of such prior materials is that described in U. S. Patent 2,102,021, Murray, having to do with a material containing on one surface of an emulsion, a latent image of graded halftone dots. There are certain limitations on the use of such material, partly due to the tendency of some forms of photographic latent image to grow or to fade differentially, depending on the storage conditions, and partly due to the fact that the ultimate record is the combination of a graded dot image and a continuous tone image which is the equivalent of a continuous tone image with a contact screen, rather than a halftone record. The present prescreened material gives a halftone record directly and the object of one embodiment is to overcome any difficulties with latent image variations entirely and of another embodiment, to overcome them sufficiently for practical purposes. In this last mentioned embodiment there may be a latent image dot pattern or perhaps a dot patern of hypersensitization, but it involves only a small part of the halftone record and differential change thereof does not adversely affect the dot quality. That is, the effects of fading or growth of the latent image are minimized.

The user of prescreened photographic material merely exposes it in the usual way in a camera and then develops it in the ordinary manner and obtains a halftone record without having used any form of halftone screen in his camera. The exposure may include flash exposures, as discussed below in the section on reproduction of scale, much as in ordinary halftone photography using a screen. The developer and development techniques are the normal ones depending on the material which is prescreened, for example, "lith" type emulsions are developed in "lith" type developers and still development may or may not be used as desired. The invention is not limited to any particular material or process. For example, silver halide emulsions which can be employed in practicing our invention include silver chloride, silver chlorobromide, silver bromide, silver chlorobromoiodide, silver bromoiodide, silver chloroiodide, and silver iodide emulsions. They include the usual gelatino emulsions as well as silver halide emulsions in which the carrier for the silver halide is one of the other known carriers such as polyvinyl alcohol, partially hydrolyzed cellulose acetate, a polyvinyl acetal, etc.

In general, according to the invention, photographic material is made up of a support such as glass or film with a uniformly thick photosensitive silver halide emulsion layer on the support. In certain halftone processes the material preferably has a high contrast. The present invention works particularly well with the so-called "lith" type films having a maximum gamma greater than 4, but it also works with materials of somewhat lower maximum gamma. In fact, in those processes in which the sensitive emulsion layer eventually is to act as a resist, the critical factor is neither the optical density nor the optical gamma, but rather the effectivenes of the material as a resist or stencil. In one embodiment of the invention the optical gamma is only about 0.1 but the resulting stencil is effectively impervious to solutions and hence its effective contrast is quite high. However, with respect to those embodiments of the invention in which the optical contrast or gamma is important, it is pointed out that gamma is an inherent property of the material itself and all photographic materials, plates, films, or papers are sold and purchased with knowledge of the inherent gamma or contrast of, or available with, the material, even though this property depends on the developer and the time and temperature of development, all of which is well known. For the making of halftone negatives or positives, from which plates are to be made by optical printing, one preferred embodiment of the invention employs a silver halide emulsion layer having a maximum gamma greater than 4.

Further, according to the present invention, the photosensitive layer has desensitization distributed throughout the layer in a uniform pattern corresponding to a contact halftone screen. It would not do for the pattern to be in the form of a simple grid since such a material would not be halftone sensitive. Specifically, the halftone pattern must be one of undulating sensitivity, uniformly distributed throughout the layer. Halftone patterns are commonly in the form of dots and each element is commonly referred to as having a center and a corner. Many variations from this standard form of halftone pattern have been proposed, such as simple lines; although these alternative arrangements are not as popular as the dot patterns, the meanings of the terms centers, corners, elements, etc., as applied thereto are well understood. The present invention applies to all forms of halftone patterns of undulating sensitivity, but not to sharp or two-tone patterns.

CLAYDEN PRESCREENING

The desensitization of the areas of lower sensitivity of this undulating pattern is preferably of the Clayden type.

The well known Clayden effect, as described in "The Theory of the Photographic Process," by C. E. K. Mees, page 254, and also in "Properties of Photographic Materials," Clerc, English translation, The Fountain Press, 1950, page 150, was discovered by Clayden in 1899 in connection with photographic exposures to lightning flashes. If a photographic emulsion is given a very brief exposure to light of high intensity, and a subsequent relatively long exposure to light of moderate intensity, the initial exposure desensitizes the emulsion, so that the subsequent exposure to a long duration, low intensity light produces less effect than if the pre-exposure had not been given. This desensitization by a brief pre-exposure is called "Clayden desensitization." "Photographic Theory," by James and Higgins (James Wiley and Sons, Inc., 1948), also refers to the Clayden effect as one in which the very high intensity exposure effectively desensitizes the emulsion toward the second exposure. Under some circumstances this effect may obviously appear as if the original high intensity exposure had been reduced by the second exposure and some authors refer to the effect casually in this manner, but as pointed out in the Mees text, this alternative is not a required feature of the Clayden effect. The preferred embodiment of the present invention employs the Clayden desensitization produced by a high intensity short exposure flash. We have discovered that this Clayden desensitization is more stable than a latent image and that it can be used with high contrast or high gamma emulsions. U. S. Patent No. 2,444,867, Yule, also discusses the Clayden effect with respect to masking in color photography.

The present invention is not primarily concerned with any particular emulsion or developer. It will work with any emulsion and developer which produces the Clayden effect. Many such materials and developers are known and if for any reason it is desirable to use some particular emulsion or some particular gamma, it is a simple matter to measure the response of the desired emulsion to Clayden desensitization. In general, emulsions which show high intensity reciprocity failure also show strong Clayden effect but the two phenomena are, of course, not the same thing. Several examples are included below to illustrate the versatility of the invention, but the invention is applicable to any Clayden desensitizable emulsion. For example, any silver halide has a characteristic density vs. log exposure curve when developed in a surface developer such as any of the four examples in U. S. Patent 2,313,523 Donovan et al. or such as the usual D85 (Kodak Data Book: Processing and Formulas). These developers are selected merely for definiteness; others work equally well. If a pre-exposure of the emulsion for .0001 second causes that characteristic curve to move to lower sensitivity values, the emulsion is per se Clayden desensitizable. This is, of course, quite well known; the last sentence is merely one illustrative definition of the property.

In any actual test, for the sake of inclusiveness, different intensities should be tried, that is, the .0001 second exposure should be to a series of different intensities (e. g. through a step tablet) of which the greatest intensity is one which produces substantially the maximum latent image and the least intensity is less than the threshold for latent image. The characteristic curve can be obtained for each step by making a subsequent 15 second exposure with the step tablet rotated through 90°.

The distribution of density in a contact halftone screen is substantially an undulating one with no appreciable areas of uniform density, i. e., with no plateaus on the top of the halftone dots and no planes in the valleys therebetween. The same characteristics are found in the distribution of desensitization according to the present invention. Almost innumerable types of contact halftone screens are known, such, for example, as those described in U. S. 2,292,313, Yule, in which the density distribution in the individual dots takes various forms. However, in all cases the distribution is a graded dot pattern, i. e., is an undulating one and the differences are only a second order effect. In fact, even the second order differences such as a tiny extra dense point in the middle of the screen dot in some screens, finds its analogy in some embodiments of prescreened film in the form of a tiny central point of hypersensitization as discussed further below. The present invention is useful with all types of such undulating distribution of desensitization, and is not limited to any particular one of the innumerable halftone screen forms.

The high-intensity short duration exposure for producing the Clayden desensitization is generally provided through a ruled screen slightly out of contact with the emulsion or through a contact halftone screen or in any other of the known ways of exposing film to make either a halftone record or a contact halftone screen. Upon thoughtful analysis, it will be realized that the intensity of the exposure falls off from the center of each dot area of exposure toward the sides, and thus the pre-exposure is of high intensity short duration at this center (which becomes the "corner" of the prescreen dot according to the terminology here adopted) and is of short duration but lower intensity at the sides (i. e., dot centers). Even the low intensity at the dot centers is still quite high to get appreciable exposure (intensity times time) in the short period available. If the intensity is so low as not to give any Clayden effect in this short period of time, it is below the inertia point on the exposure scale, so that there is no question of real image formation. The amount of exposure to give sufficient latent image to cause measurable density upon development, is almost invariably greater than that required to produce desensitization. At constant short time, increasing intensity increases the desensitization up to a certain point when a weak latent image starts to form, and the maximum intensity of the short duration exposure is adjusted so that it does not exceed this optimum value. Also it may well be that the relative amounts of desensitization are not linearly proportional to the amount of exposure across each dot, but the distribution of exposure can easily be controlled to give whatever distribution of desensitization is required. For example, the Yule Patent 2,292,313 mentioned above describes various types of contact halftone screens and these give various distributions of exposure so that the Clayden desensitizing can be done through any desired type of contact halftone screen. We have found, however, that satisfactory results are obtained by ordinary halftone exposures through ruled screens out of contact with the emulsion. The distribution of desensitization in the individual dots is controlled to some degree by the size of the exposing aperture, but is otherwise not critical. The best results have been obtained using the ordinary high intensity short exposure flash lamps which are in common use by photographers. The so-called speed lamps or strob lamps of the vapor discharge type appear to be quite satisfactory for giving the Clayden desensitizing exposure. The desensitized film constitutes a pre-screened product ready for sale to the graphic arts trade and for use to give a halftone negative directly upon exposure in an ordinary camera to a continuous tone image and normal processing.

DESENSITIZATION PLUS HYPERSENSITIZATION PRESCREENING

In the preferred embodiments of the invention the sensitivity scale of the material is extended by including areas of hypersensitization in the centers of the halftone elements, i. e., between the areas of desensitization which constitute the corners of the halftone elements. This hypersensitization is produced by exposing the centers of the elements by an exposure which in general is less than the threshold exposure but which in some other embodiments is quite intense so that the latent image is developed to form a tiny black dot even if no further exposure is given in this area. For the purposes of the present specification it is not generally necessary to distinguish between hypersensitization and latent image; they are considered just two species of the same thing. If the exposure is less than threshold, no real image appears on ordinary development without further exposure, but hypersensitization does exist and there is some latent image which becomes apparent in the presence of additional exposure. When greater hypersensitizing exposures are used, the emulsion is unquestionably referred to as containing a latent image which, of course, includes and surpasses the hypersensitization. That is, there is a hypersensitizing exposure present whether or not it is also intense enough to produce a real image. Since one embodiment of the invention employs a hypersensitizing exposure below threshold and another employs an additional amount of exposure making a total greater than threshold, it is not necessary to use distinguishing terminology when describing the invention generically.

Thus from one point of view the invention comprises the combination of desensitization and hypersensitization, the latter by exposure to light, to form a halftone pattern of undulating sensitivity uniformly distributed throughout a silver halide emulsion layer. The desensitization is preferably of the Clayden type, but the combination is novel even when the desensitization is simply by the printing of a desensitizer or by other methods such as the pressure prescreening described in copending application Serial No. 234,331, filed June 29, 1951, by R. E. Damschroder and R. E. Stauffer.

In a preferred embodiment of the invention the hypersensitizing or latent image is made by very intense exposure and consists of a tiny hard dot (i. e., a tiny intense latent image) with an area less than 20 percent of the area of an element of the screen pattern. Such a dot has satisfactory keeping qualities and does not tend to grow or to fade excessively. The purpose of the dot is to constitute a center at which development will start. This improves the dot quality, and lengthens the permissible scale of an original which is to be properly reproduced.

In another form of the invention this latent image fully complements the desensitization image and the two together give an effective sensitivity distribution equivalent to the density distribution in a contact halftone screen. It will be realized that the latent image halftone dot in this case does not act in the same way as that in U. S. 2,102,021, Murray, mentioned above. The Murray dot is separate from his image, is always developed fully, and then acts as a contact halftone screen. The present latent image dot acts as a partial pre-exposure of certain areas to give increased sensitivity in the shadows when making a halftone negative and hence to lengthen the effective range of the present desensitized screen when the available desensitization range covers only the highlights to middle tones.

In this second species of the latent image embodiment of the invention, the sensitivity at each screen element increases substantially continuously from the point of maximum desensitization first up to the point of no desensitizing and then the hypersensitizing latent image takes over so that the sensitivity continues to increase up to the point of maximum pre-exposure which may or may not give a visible tiny dot without further exposure depending on the development time and temperature.

REPRODUCTION OF SCALE

The question of tonal range available brings up a number of points. As an example of the extent of desensitization, it is pointed out that in one case a regular high contrast film when flashed by a speed lamp of the vapor discharge type (about .0003 second) desensitizes about .45 to .50 in log E units measured at a density of 1.0. Higher speed flashes do not appreciably increase the effect. In this example the densitization is increased by storing the material at 100° F. and 80% relative humidity for a week; the desensitization then remains constant at about .6 to .65 unit log E if kept from then on under normal conditions. If the desensitization were constant at all densities, the gamma in the desensitized areas would be the same as that in the unexposed areas. In general, this is not true with Clayden desensitization and high contrast films having a maximum gamma from 4 to 14 are often changed by the desensitization to have a somewhat lower gamma between 2 and about 7. This is not too objectionable as long as the gradient stays above 2 or 3 over the significant part of the characteristic curve. This reduction in gamma corresponds to higher desensitization, measured in log E units, at higher densities. Clayden desensitized "lith" emulsions have been found to have a gamma greater than 3 up to a density of 2 or more, and are hence satisfactory for the present invention.

On the other hand, the falling off of gamma is not always objectionable. It is well known that when an ordinary halftone negative has a slightly vignetted dot the final printing from this negative onto a plate can be varied slightly to vary the ultimate dot size to some degree. Similarly, if the resultant halftone negative or positive obtained with the present material has slightly vignetted dots, the one making a plate therefrom can take advantage of this fact to vary the exposure range. The objection to this latter procedure is that the person making the printing plate prefers not to be concerned at all with optimum dot size or contrast range and prefers to have these questions fully decided at the time the negative is made. Accordingly, the preferred embodiments of the present invention are those in which the gamma stays quite high.

There are three very useful ways of controlling the contrast when using the present invention to make a halftone negative or positive, independent of the range of contrasts available due to the degree of desensitization or other pretreatment. One of these features is usually referred to as "still development." If the film, after exposure, is placed in a tray of developer and is only agitated for a short period at the beginning of development, the exposure range is effectively compressed, for the well-known reason that the areas receiving the maximum exposure use up the immediately adjacent developer fast, (and may actually produce inhibiting agents) and hence do not get as much effective development as the lesser exposed areas which do not need much developer. This compression of the exposure range increases the contrast which the material is able to accommodate. For example, a prescreened film according to the present invention which will under standard development cover only a range of 1.0 say, will accommodate and record a range of exposures of 1.5 if still developed.

If still development is pushed to the extreme so that there is absolutely no agitation, dot quality is reduced but this is overcome by the high gamma of the final printing onto a printing plate. Also, excessive still development may have some effect on tonal reproduction with a tendency toward low contrast in the highlights.

A second method of extending the scale or enhancing the Clayden desensitization involves a pre-developer bath into which the exposed film is immersed immediately prior to development. For example, bathing a film which has received both a Clayden desensitized prescreening and a low intensity image exposure in a mild oxidizing bath such as described below, will greatly suppress the silver density in the desensitized areas without suppressing the image exposure nearly so much, although both exposures are suppressed somewhat by this prebath:

Copper sulfate _____ grams__ 1
Potassium bromide _____ do____ .03
Citric acid _____ do____ .2
Water _____ liters__ 1

Bathe for 30 seconds and wash for 2 minutes in running water at 70° F. prior to development. The treatment extends the Clayden effect without adversely affecting the individual dot formation.

Also, Clayden effect is associated with developers of the surface type and the Clayden effect is increased (accompanied by a lowering gamma) when the formaldehyde bisulfite concentration is increased. Also, the ordinary "lith" developers are perhaps a little superior to glycine developers since the latter produce a long "toe" on the characteristic curve in the desensitized areas.

The third contrast control method is the use of a uniform fogging exposure, usually referred to in photomechanical work as a flash exposure. The flash exposure is the equivalent of reducing the exposure range of the original subject by some factor. For example, an original subject having a tonal range equivalent to 1.6 in log E units will be reduced to, say, 1.1 due to the overall flash, so that it may be easily recorded on material covering a range of only 1.1. These three systems of controlling range are preferably combined and for the sake of simplification it is generally better to standardize on one form of still development with or without the mild oxidizing prebath, and to vary only the flash exposure. For example, with one species of the invention it is recommended that the developer be agitated for exactly 30 seconds and then held still for the remainder of the total development time of 2 minutes. This degree of still development compresses the exposure range somewhat. Additional compression when needed is obtained by various amounts of flash exposure as desired.

EXAMPLES

Thus the invention may take various forms and have various distinctive features depending on the process and material with which it is to be used. Since the invention is applicable to innumerable materials, the examples of the invention find their primary distinguishing features in the forms or types of desensitizing and hypersensitizing.

In Example 1, a silver halide emulsion is exposed through a contact halftone screen or a ruled halftone screen at normal screen separation to a high intensity short duration flash exposure of sufficient intensity and sufficiently short duration to produce Clayden desensitization of at least .1 and up to 3 or 4 or even more measured at a density of 1. The upper limit is not too critical as long as the effective sensitivity distribution is undulating. The various examples are also applicable to various types of supports; e. g., metal, film, glass, silk screen, or paper.

Example 2 receives both Clayden desensitization as described above to produce the corners of the dots in the undulating halftone pattern of sensitivities and also a hypersensitizing exposure of the centers of the dots. One preferred embodiment of either of these two examples has a gamma greater than 4 prior to desensitizing and greater than 2 even in the desensitized areas.

Example 3 similarly combined hypersensitizing by exposure with desensitizing by chemical treatment or, in Example 4, by pressure desensitization.

In all cases, the particular form or shape of the desensitizing of the corners of the dots is not a critical part of the present invention whereas in our copending application, mentioned above on posterizing prescreening, the desensitization does have a peculiar, and not undulating, distribution. On the other hand, the particular shape of the hypersensitization in each dot does provide several additional examples.

In Example 5, the hypersensitization is in the form of a tiny dot with an area less than 20% of the area of an element of the screen pattern. The sensitivity distribution tends not to be truly undulating due to this "hard core" latent image in the center of each dot but it is still effectively and substantially undulating as required to give halftones. Incidentally, for making positives for photoengraving, the area of the hypersensitized dot is sometimes 40 to 60% of the element area.

Example 6 on the other hand has the hypersensitizing exposure complementary to the desensitization so that the distribution of sensitivity is strictly undulating. The core of this hypersensitizing (again less than 20% of the area of an element) may reach threshold and thus include a definite tiny dot image even without further exposure or it may be less than threshold.

Example 7 also involves the combination of desensitization and hypersensitization but in this case the form of the hypersensitization is one particularly adapted to photogravure or intaglio halftone processes. These processes require a halftone dot which leaves a supporting wall between dots even in the deepest shadows of the final positive printer. This particular embodiment of the invention is concerned with the simplest halftone arrangement in which the elements are essentially squares with desensitized corners. In this example, the hypersensitizing exposure of the center of each element is made by an image shaped substantially like a Maltese cross with the ends of the cross in the middles of the sides of the square halftone element.

All of these examples except the last one which is intended only for gravure work may be applied to various resist and stencil materials including those described in U. S. Patents 2,500,052 and 2,592,368 Yackel and patent application Serial No. 111,008, filed August 18, 1949, by Yackel and Amering. The fact that the "lith" emulsions have extremely high gammas and the Yackel patents concern some emulsions with optical gamma as low as 0.1 indicated that gamma is not a critical characteristic of the present invention, although some preferred embodiments must have the gamma required for the particular process in which the embodiment is to be used. Similarly, various developers may be used and, since color development has been proposed to obtain both a silver dot and a colored dot for separate treatment or for use for special masking effects, prescreening is also useful with such processes.

Our invention contemplates the use of any desensitizable silver halide emulsion and, by way of examples thereof, we mention the emulsions described in British Patent 635,841, Davey et al., Example 1 of which has a quite high value of desensitization by Clayden exposure. For high gamma embodiments, the emulsion is preferably of the "lith" type, i. e., a high contrast, fine grained, gelatino silver chloro bromide emulsion, ortho or pan sensitized and having a relatively high concentration of silver halide per square foot.

The following emulsion when pre-exposed (Clayden desensitized) by a .001 second exposure has a desensitization factor at a density 0.60 above fog, equal to 0.84 log E unit and a gamma of 1.3 when the image exposure is 30 seconds and the film is developed for 2.25 minutes in D85 developer at 68° C.:

A solution of 25 grams of a derivative of gelatin as described in U. S. Patent 2,525,743, Frame, 43 grams of sodium chloride and 1.75 grams of potassium bromide are dissolved in 1290 cc. of distilled water at 70° C. Two solutions, 37.5 grams potassium bromide in 130 cc. water at 40° C. and 170 grams silver nitrate in 650 cc. water at 60° C., are simultaneously run into the first solution with good stirring over a period of six minutes. After completion of the precipitation, the soluble salt by-products of the reaction are removed as described in U. S. patent application Serial No. 768,475, Yutzy and Frame, filed August 13, 1947, and 100 grams of photographic grade gelatin and sufficient distilled water are added to give a total weight of 3.0 kilograms. Saponin solution and an ortho sensitizer such as those disclosed in U. S. Patent 2,493,748, Brooker and Keyes, are added and the emulsion coated onto a suitable support.

The emulsion described below appeared in the U. S. Department of Commerce PB Report 20090, June 23, 1945, covering B. I. O. Sub Committee Report No. C9/408. This emulsion has a gamma of 3.6 when developed 2.5 minutes in D85 at 70° F. and shows a Clayden desensitization factor of about .27 log E units at a density of 2.0 above fog:

*Solution A*

Gelatin_____ 50 grams.
Potassium bromide_____ 63.5 grams.
Citric acid_____ 14 grams (dissolved in 35 cc. solution).
Water_____ 2000 cc.

Dissolve gelatin and potassium bromide in the water and add the citric acid. Temperature: 40° C.

*Solution B*

Silver nitrate_____grams__ 170
Water _____cc__ 2580

Dissolve at 35° C.

*Solution C*

Sodium chloride_____grams__ 85
Water _____cc__ 250

Dissolve at 40° C.

Add Solution B to A over a period of 8 minutes and stir for a period of 4.5 minutes additional. Add quickly Solution C to the mixture; stir 30 minutes more at 40° C. and add 200 grams gelatin soaked in 1000 cc. distilled water and stir at 40° C. until gelatin is dispersed.

Chill and set to a jelly; break up into small pieces and wash in cold water 1 hour.

Then drain emulsion, remelt at 40° C. and add 150 grams of gelatin and stir until dispersed. Adjust to a final weight of 6.71 kg. with water if needed, and coat on a transparent film support.

The fact that there are all of the above groups of examples and all of the individual examples within each group is indicative of the fact that the invention is not confined to any particular emulsion or to any particular process but is rather concerned with the fundamental idea of prescreening. In this connection the invention involves, on the one hand, Clayden desensitization and, on the other hand, the broad idea of combining desensitization with exposure hypersensitization.

The invention and its various embodiments will be fully understood from the following description when read in connection with the accompanying drawings in which:

Figs. 7–9 illustrate schematically the use of a material made according to the invention.

Figs. 10–12 similarly illustrate methods of manufacturing film according to the invention.

Figure 13:
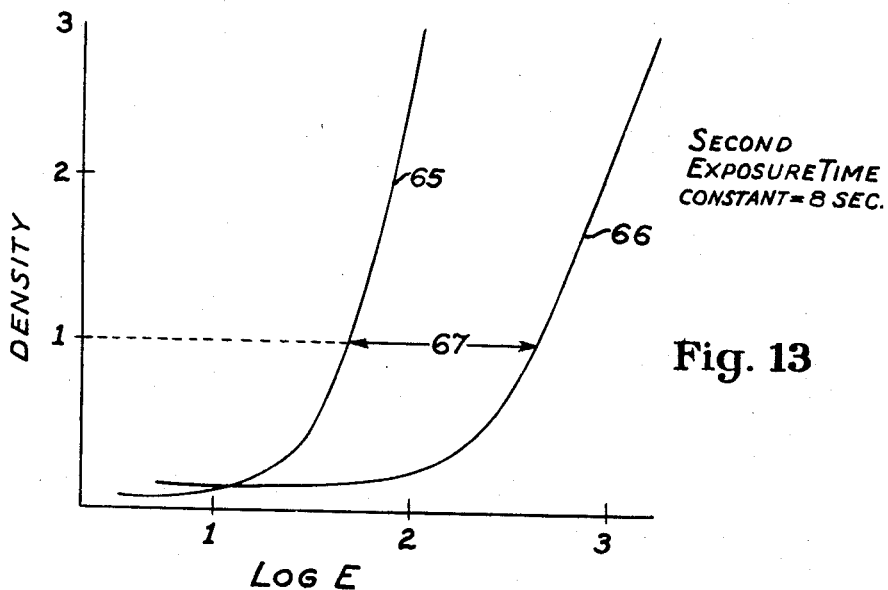
Figure 14:
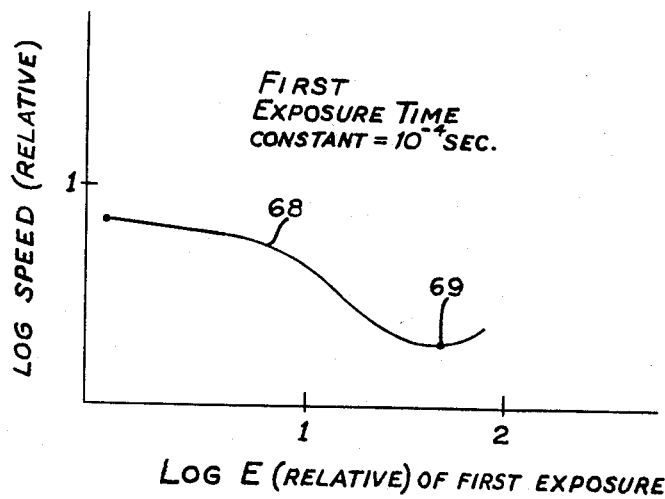

Figs. 13 and 14 graphically illustrate the effect of Clayden desensitization.

Fig. 15 illustrates schematically a preferred form of apparatus for manufacturing film according to the invention.

Fig. 16 is a front view of the aperture plate used for the desensitizing Clayden exposure in Fig. 15.

Fig. 17 is a front view of one form of the aperture plate for making the hypersensitizing exposure in Fig. 15, specifically the form for making prescreened material for use in intaglio halftone processes.

Figs. 18-A and 18-B illustrate the difference between the halftone structure in screen positives respectively for deep etch lithography and for intaglio halftone gravure.

Figs. 19 and 20 are flow charts illustrating the use of prescreened resist materials.

Figure 21:
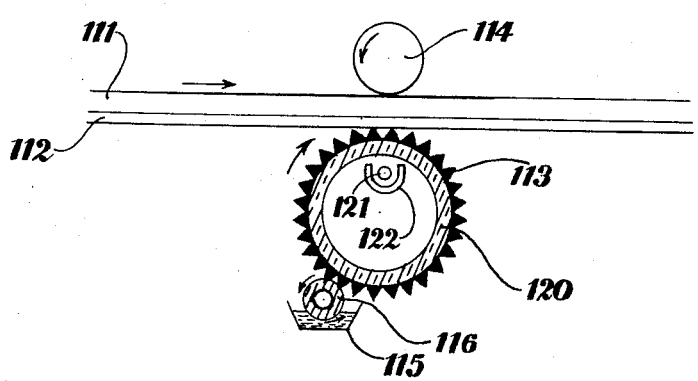
Figure 22:
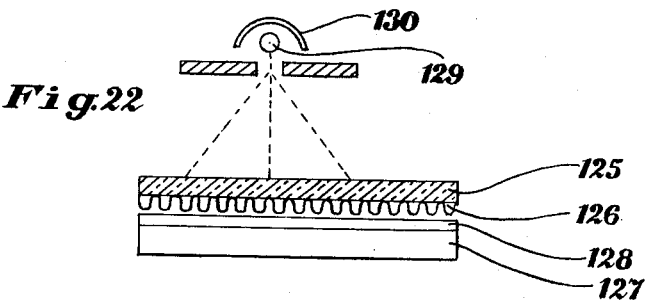
Figure 23:
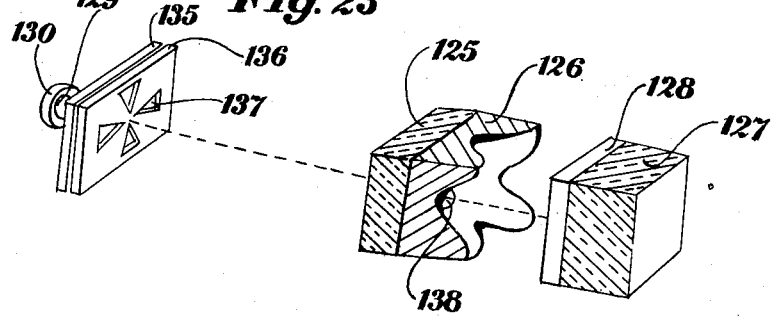

Fig. 21 illustrates the manufacture of material prescreened by pressure desensitization and exposure hypersensitization. Figs. 22 and 23 illustrate the manufacture of prescreened material by chemical desensitization combined with exposure hypersensitization.

Figure 1:
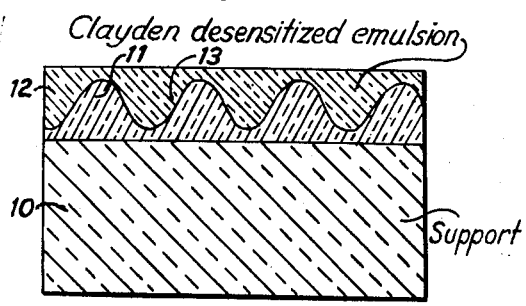
Figs. 1–6 illustrate schematically greatly magnified cross sections of various embodiments of the invention.

In Fig. 1 a support 10 of glass or film carries a uniformly thick photosensitive silver halide emulsion layer of high contrast or gamma, greater than 4. This layer has Clayden desensitized areas 12 and sensitive areas 11 distributed and graded in the form of the density distribution in a contact halftone screen. The line of demarkation 13 between the desensitized and sensitized areas is shown as a sine wave, but this may or may not represent the actual cross sectional distribution within the emulsion layer. If the emulsion tends to absorb the exposing light, the desensitizing would tend to be confined to the upper surface as shown and would extend downward into the emulsion giving a sharp demarkation line such as illustrated at 13. There is always some tendency for the light to be absorbed and the effect of the exposure is greater nearer the surface facing the incident light. On the other hand, the absorption effect may be small and the desensitizing may actually extend through the layer although the distribution of desensitizing over the layer will still be in the form of the density distribution in a contact halftone screen. Exactly the same question arises in illustrating the density distribution in a contact halftone screen itself.

Figure 2:
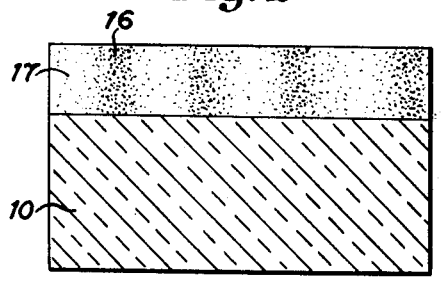

In Fig. 2 the emulsion layer is stippled, heavily in areas 16 corresponding to high sensitivity and lightly in areas 17 corresponding to low sensitivity caused by the Clayden desensitization. The centers of the areas 17 have received the greatest Clayden exposure and the centers of the areas 16 have received the least Clayden exposure. The correspondence between Figs. 1 and 2 should be obvious. Both illustrations of exactly the same effect are given to avoid misleading the reader into believing that the Clayden desensitizing exposure definitely provides a critical line of demarkation such as 13 within the emulsion layer although, as pointed out above, there is in general some tendency toward such a demarkation line.

Figure 3:
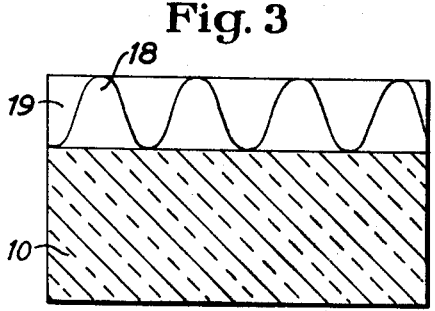

Fig. 3 uses the same convention as Fig. 1. In this case, there are still no areas of constant sensitivity or constant degree of desensitizing but the minimum sensitivity is substantially zero and the areas of maximum sensitivity have received substantially no Clayden desensitizing. However, the film shown in Fig. 1 has effectively higher speed (in terms of highlights) and produces better halftone contrast, although it has less preferable, but not too objectionable, dot quality. Furthermore, complete desensitization as represented by Fig. 3, is rarely, if ever, accomplished in practice.

Figure 4:
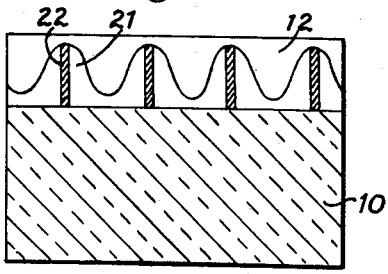

Obviously it would be difficult using the convention of Fig. 2, to distinguish between the embodiments shown in Figs. 1 and 3 and the convention of Fig. 2 fails to emphasize the fact that there are no areas of constant sensitivity. Even the convention of Figs. 1 and 3 does not lend itself directly to the illustration of the combination of desensitizing and hypersensitizing. In Fig. 4 the desensitized areas 12 correspond to those of Fig. 1 but the centers of the sensitized areas 21 are each provided with a tiny intense latent image illustrated as stripes 22. This method of illustrating is a natural one if one considers that the material represented by Fig. 4 would give tiny sharp dots, corresponding to areas 22, if developed without further exposure in a camera.

However, in certain embodiments of the present invention, the effect of the latent image is equivalent to increased sensitivity in the areas which have not been Clayden desensitized. Therefore in Fig. 5 the tiny sharp latent image is illustrated by broken lines 23 extending from the top of the sensitive areas 21. As pointed out above, the purpose of this embodiment of the invention is to provide a sharp center to insure uniform dot development. If the material is used in making a negative, this provides a tiny white dot in the deepest shadows of the positive reproduction which may be useful or may be eliminated in the final printing step. When the material is used in making a positive, this provides a tiny black dot which is sometimes useful or again may be eliminated when making the final reproduction. The dot-dash line 24 is included to represent the minimum pre-exposure which is by itself developable to an image. The broken lines 23 extend above this showing that they form tiny black dots upon development whether further exposed or not.

Figure 5:
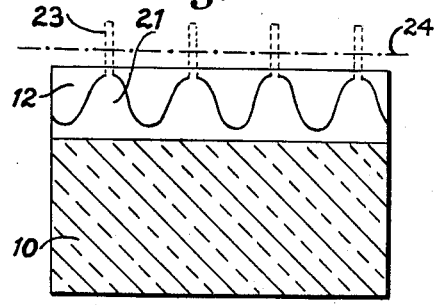
Figure 6:
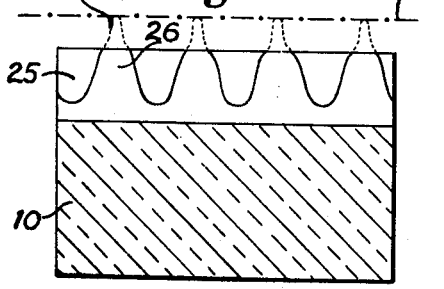

In Fig. 6, the same convention is used as in Fig. 5. The desensitizing as represented by areas 25 does not extend over the whole of the emulsion area leaving sensitive areas 26 with plateaus of uniform maximum sensitivity. A latent image or hypersensitization is imposed on these plateaus giving the effect of increased sensitivity as represented by broken lines 27. The hypersensitization and the desensitizing are complementary and the effective sensitivity is distributed to be equivalent to the density distribution in a contact halftone screen. The maximum latent image in this particular example just reaches the line 24 so that there may or may not be a tiny dot in deepest shadows depending on development conditions (which may be considered as raising or lowering the line 24). It has been found preferable to give enough hypersensitizing exposure so that there is a definite tiny dot under normal development conditions, i. e., so that the line 27 goes above the line 24.

In Fig. 7 an original subject is represented by a step tablet 30 having 5 density levels. Light represented by arrows 31 passes through this step tablet 30 to expose a photosensitive material 35 on a base 10 according to the invention as represented after development in Fig. 8. The tops of the sensitive areas only are exposed through the densest portions of the tablet 30 and more of the sensitive areas are successively exposed through the successively less dense steps. In those embodiments of the invention which have a latent image exceeding the threshold value of the film, there is always a small dot. When the latent image is just slightly less than the inertia value, the latent image acts merely as hypersensitizing. As illustrated in Fig. 9 the final image constitutes a normal halftone negative of the tablet 30.

One method of giving the Clayden desensitizing exposure is illustrated in Fig. 10 in which a sensitive high contrast emulsion 40 is exposed to a high intensity short duration flash represented by arrows 42 through a contact halftone screen 41 whose density distribution is conventionally indicated. It is not so convenient to add a hypersensitizing exposure to this particular embodiment although it is possible with a two-colored contact screen by the use of filters.

Fig. 11 illustrates the method of producing the Clayden desensitizing for use either in the simple embodiment having different desensitizing only or in the more complex embodiments in which hypersensitizing is added to the Clayden desensitizing. In Fig. 11 a ruled halftone screen 51 is held at usual halftone separation from a high contrast sensitive emulsion 50. A vapor flash lamp 52 is flashed once to illuminate a diffusing screen 54 and apertures 56 in an opaque mask 55. Light from these apertures passes through the openings in the screen 51 to illuminate and expose points such as 57 on the emulsion layer 50. A plurality of apertures 56 is used to increase the intensity of exposure. The exposures from the different apertures add at points such as 57 on the emulsion.

Fig. 12 illustrates the additional step which may be performed before or after the step illustrated in Fig. 11, to add a latent image dot in the areas between those desensitized by the Clayden exposure of Fig. 11. In Fig. 12 a tungsten lamp 61 illuminates the diffusing layer 54. A mask 62 is provided with an aperture 63 centrally located between the areas corresponding to the apertures 56 of Fig. 11. Only a single aperture 63 is shown, for clarity, but a plurality of apertures can be used symmetrically centered between positions of the apertures of the mask 55. The exposure from the aperture 63 falls on the emulsion 53 at a point 60 which is off-set from the desensitized area 57. Thus the latent image is between the areas which have been desensitized. In one species of the invention, the aperture 63 is quite small and only a tiny central latent image dot is produced. A larger aperture 63 or a series of exposures through successively larger apertures is used to give a latent image complementary to the desensitizing to combine therewith to have an equivalent sensitivity distribution corresponding to the density distribution in a contact halftone screen. In one highly preferred form of the invention, the ruled screen 51 has extra wide lines, twice the width of the screen openings therebetween; this refinement tends to confine the desensitizing and hypersensitizing exposures to mutually exclusive areas on the film. The Clayden exposure of Fig. 11 must be sufficiently short to give desensitizing and must be sufficiently intense to give a maximum desensitizing in the center of the exposed areas, i. e., in the dot corners. The dot exposure (intensity×time) for Clayden desensitizing is of the same order as that required for producing a latent image, and is slightly less than that which gives a latent image intense enough to be directly developable. The latent image exposure shown in Fig. 12 must be of sufficient intensity to provide the hypersensitizing required. This hypersensitizing may be less than the inertia exposure and merely sufficient to hypersensitize equivalent to a vignetted halftone dot or may be highly intense to give a tiny sharp dot to act as a development center.

Fig. 13 illustrates the effect of Clayden desensitization. The characteristic curve 65 of a high contrast emulsion is shown with a gamma of 8.5. When such an emulsion is flashed with a speed lamp of high intensity, the duration of the flash being .0001 second the characteristic curve shifts to 66 and has a gamma of 5.0. The degree of desensitization in log E units at a density of 1 is indicated at 67. This is a typical case. An emulsion with a gamma of 6.0 was found to have a gamma of 3.8 after desensitization, the degree of desensitization at a density of 1 being .8 log E units. Desensitization (at density 1) as low as .2 log E units has been found to give satisfactory results when a tiny hard dot latent image is present and still development is used.

It is possible to produce emulsions in which the curve 66 reaches the solarization point at a relatively low exposure. This is harmless as long as the solarization point does not occur at so low a density that the material fails to cover a useful exposure range. The effect is in the nature of infinite desensitization at high densities which in turn affects the dot quality of the negative and tonal quality of the reproduction, particularly in the highlights when the material is used in making a halftone negative. Normal materials do not exhibit this peculiarity, however, and the point is mentioned merely to illustrate variations which are possible within the realm of the invention.

The desensitization due to the Clayden effect requires the exposure time to be short. The extent of desensitizing increases with intensity. Fig. 14 illustrates the effect of the Clayden exposure. The curve is a relative one and is plotted for the example mentioned above in which a gamma of 8.5 is reduced to a gamma of 5.0 with a desensitization at a density of 1, immediately after exposure, of about .5 which is increased to about .7 log E units by conditioning for one week at 100° F. and 80% R.H. In Fig. 14 the speed of the film as indicated by curve 68 decreases slowly up to a certain exposure after which it falls off rapidly to a point 69 and then the latent image apparently starts to counteract the desensitizing to give an apparent increase in speed at higher exposures. Such intensities are avoided in practice since they produce secondary dots between the shadow dots although there is the possibility that they might be useful for special purposes. This is definitely a very secondary effect and is not of primary consideration in connection with the invention, however.

Fig. 15 illustrates a convenient arrangement for the manufacture of the preferred embodiment of the invention. A high contrast film 50 is positioned behind a ruled halftone screen 51 which for convenience in handling is cemented to a cover plate 71. Specifically, a 150 lines per inch cross line screen 51 (with the ruling at 45° to the vertical, i. e., at the same angle as the openings in the aperture plates 62 and 55) is located in front of the film 50 so that the ratio of the line spacings in the screen 51 to the screen distance 72 is approximately the same as the ratio of the aperture spacing between the apertures 56 to the aperture to film distance 73. For example, the screen distance of .291 inches is the sum of the film to cover glass .227 inch space plus the optical thickness of the cover glass 71, namely, .064 inch. This screen distance is chosen, as is common in halftone practice, in accordance with the diffraction effects in order to obtain the proper light distribution behind each opening of the screen. The aperture spacing in the aperture plates and the film to aperture distance can vary as long as the ratio remains the same as the ratio of the screen ruling to the screen distance. In the above example, a film to aperture distance of 68 inches would be used with an aperture spacing of 1.47 inches measured along a 45° line.

The screen distance of .291 inch is not too critical insofar as it effects the diffraction pattern, provided its relationship to the aperture spacing and film to aperture distance is approximately correct. With an aperture spacing of 1.47 inches and a film to aperture distance of 68 inches, the calculated screen distance would be .308 inch, but .291 inch is used instead because it has been found that the shorter screen distance, about 5% less, is less critical where more than one aperture is used in making either exposure (tolerances on all of the distances being held to about ±3%).

The exposures may be in either order, but we have noted slightly better dot structure in the middletones if the hypersensitizing exposure is first. The desensitizing exposure is made by light from a vapor flash lamp 77 which passes through a field lens 76 and a diffusing sheet 75 and then through apertures 56 in the aperture plate 55, after which it is reflected by a semi-transparent or hinged mirror 74 to the film 50 to expose and Clayden desensitize areas 57. The reflectors 78 are to increase the intensity of the light falling on the diffusion material 75 and to improve the uniformity of the light falling on the film 50. The field lens 76 may conveniently be of the Fresnel type. The desensitizing exposure is normally about .0003 second duration and in any case it is less than .02 second, preferably less than .001 second. Preferably the mirror 74 is totally reflecting and is hinged at the point 79 so that it may be swung against the plate 55 while the hypersensitizing exposure is made.

The hypersensitizing exposure through aperture 63 from lamp 61 exposes and hypersensitizes area 60 on the film 50. For lithographic purposes the aperture 63 is simply a round hole. The duration of the hypersensitizing exposure is not too critical but the keeping qualities of the latent image are best if the exposure is not too short or too long, i. e., not less than .02 second and not more than 2 minutes. Preferably exposures of 2 seconds' duration are used, but this can be varied over quite a wide range. However, the total amount of the hypersensitizing exposure, i. e., intensity times time, is somewhat critical since in certain embodiments it must be just less than threshold exposure and in other embodiments must exceed threshold exposure so as to give a tiny hard latent image dot. Preferably the hypersensitizing exposure given is greater than that which just gives the desired degree of hypersensitizing. The effect then fades sligthly on aging and levels off to leave just the desired degree of hypersensitizing which then remains sufficiently constant for the life of the product.

Fig. 16 illustrates the arrangement of the apertures 56 in the plate 55. Ten apertures are shown and the aperture spacings are indicated at 81 which is effectively parallel to the rulings of the screen 51; these rulings are at 45° to the edges of the screen. The Maltese cross area in dotted lines shown in 84 has to do with the intaglio gravure embodiment of the invention discussed in connection with Fig. 17. It is shown in Fig. 16 to illustrate the relative location of the desensitizing and hypersensitizing apertures.

Fig. 17 illustrates one form of the aperture plate used for the hypersensitizing exposure. In this particular form the apertures are in the form of Maltese crosses 82, four such crosses being shown. The centers of the crosses may be joined or slightly separated as shown. The aperture 83 shown in dotted lines is included merely to indicate the relative position of desensitizing apertures. If the desensitizing apertures are considered as being at the corners of the halftone elements, it will be noted that each Maltese cross has its center in the center of the the halftone element and has the four ends of the cross in the middles of the sides of the square element. Other embodiments of the invention use a simple aperture rather than a Maltese cross.

The effect of the Maltese cross is best explained with reference to Fig. 18–A which shows the dot structure for different tones in a screen positive, for example, for use with deep etch lithography and, in Fig. 18–B, a corresponding sketch of dot structure in a screen positive for intaglio halftone gravure. The odd shape of the individual dots provides the ridge for the doctor blade used in intaglio printing, even when the white area is reduced to a minimum.

The process shown in Fig. 19 illustrates the application of the invention to certain materials used in preparing halftone printing plates through a resist. According to the invention a photosensitive resist 91 mounted on a support 90 is prescreened by the Clayden effect, the sensitivity being represented by the wavy line 92. When such material is exposed to a continuous tone image represented by arrows 93, the width of the effectively exposed dot in each case depends on the amount of exposure. This is illustrated in the second step of the flow chart in which areas 94 are those exposed and the alternate areas 95 are effectively unexposed. To the left of the drawing only small dots 94 are exposed whereas wider dots are exposed to the righthand side corresponding to the intensity of the image in the respective areas. Since the exposed areas are normally hardened, the step of washing off the remaining gelatin leaves the exposed areas as dots 94 of resist on the support 90. Such an image is negative to the exposing light since the areas of greatest exposure have the largest dots. In a process such as that described in U. S. 2,500,052, Yackel, the exposed areas tend to flake off leaving a positive halftone image of gelatin dots on the support 90. In either case the residual dots are hardened and then the support 90 is treated through the stencil formed by the resist dots 94. In Fig. 19 this treatment is illustrated as hydrolysis of the support 90 by means of a hydrolyzing solution 96 in a container 97. Such hydrolysis of a cellulose ester printing plate is described in U. S. 2,284,381, Staehle and Amering. The hydrolyzed areas are shown at 98 and after the resist is removed, a lithographic plate 90 with hydrolyzed areas 98 results.

Fig. 20 illustrates a somewhat similar process in which prescreening according to the present invention is applied to a printing plate process similar to that described in copending application Ser. No. 111,008, filed August 18, 1949, by Yackel and Amering. In this case a prescreened photosensitive resist 101 mounted on a support 100 receives the continuous tone image 93 so that areas 104 are exposed and areas 105 are effectively unexposed. The prescreened resist 101 in this case contains both silver halide and an acrylate resin dispersion. In the exposed areas 104 the gelatin is sufficiently hardened so as not to wash out, but the areas 105 are still unhardened and the gelatin washes away leaving in areas 106 the resin dispersion only. This resin coagulates forming areas 107 which are impervious to a hydrolyzing solution whereas the areas 104 still contain gelatin particles as well as resin and therefore transmit the hydrolyzing solution. The hydrolysis is illustrated in the next step of the chart so that the areas 108 of the support 100, behind the exposed areas 104 are hydrolyzed, whereas the areas behind the resin 107 are not hydrolyzed. The resist is then removed leaving a lithographic printing plate in which the ink receptive areas constitute a positive image relative to the original exposing light.

In both Figs. 19 and 20 it will be noted that the optical density and optical gamma of the prescreened material is not the controlling factor. The contrast of the finished plate depends on the resistance of the stencil to the hydrolyzing solution. In the normal operation of the process, this resistance is effectively infinite and hence the material has an effective contrast of infinity even though the actual optical contrast may be very low or even zero.

Sensitized silk screen is similarly prescreened according to the invention simply by desensitizing and hypersensitizing a halftone pattern on a resist coated on a silk screen support. The final processed halftone image acts as a stencil in the usual way.

In Fig. 21 a strip of photographic film comprising a base 111 and a photosensitive silver halide emulsion layer 112 is passed between pressure rollers so that a halftone dot pattern is printed by pressure points 113 causing shear stress in the emulsion which is held against the pressure roller by a back roller 114. This figure is included merely to illustrate the combination of pressure desensitizing with exposure hypersensitizing. Pressure presensitizing is most effective in the presence of moisture which is provided from a bath 115 and roller 116 onto the tips of the pressure points 113. The pressure roller consists of these opaque points 113 mounted on transparent glass cylinder 120. Of course, the pressure points 113 are shown greatly exaggerated in size whereas they are in practice produced by etching a thin opaque coating on the cylinder. Light from a lamp 121 and reflector 122 passes through the glass cylinder 120 and between the pressure dots 113 to expose areas of the emulsion 112 between the halftone dot corners which are desensitized by the pressure points 113.

Certain methods of producing prescreened material involve printing of desensitizing solutions such as photographic hypo onto a photosensitive emulsion. The present invention is not concerned with the merits of these prior systems, but Figs. 22 and 23 are included to illustrate the combination of such a system with hypersensitizing by pre-exposure. In Fig. 22 a transparent printing plate 125 with opaque dots 126 thereon carrying a desensitizing solution is pressed into contact with a photosensitive silver halide emulsion 128 carried on a suitable support 127. While the emulsion is thus being rendered desensitized, light from a lamp 129 and reflector 130 passes through an aperture in an opaque mask 131 and then through the transparent plate 125 and between the printed dots 126 to expose the areas of the emulsion 128 which are not desensitized.

A similar arrangement is shown in perspective in Fig. 23 in which the aperture in the mask 136 is in the shape of a Maltese cross 137 in front of a diffusing surface 125. A single element of the printing plate 125 is shown with ¼ of each of four "corner" dots and a clear area 138 therebetween. It will be seen that the clear area 138 acts in the nature of a pinhole camera so that the exposure of the element of the emulsion 128 is effectively to the image of a Maltese cross.

Thus the present continuation-in-part is directed primarily to the Clayden process of prescreening, secondly, to the combination of hypersensitizing by exposure with desensitizing, preferably of the Clayden type, and thirdly, to the various species of hypersensitization in combination with desensitization.

We claim:

1. A photographic material comprising a support and a uniformly thick photosensitive silver halide emulsion layer on the support with a halftone pattern of undulating sensitivity uniformly distributed throughout the layer with the areas of lower sensitivity Clayden desensitized.

2. A material according to claim 1 in which the layer has a maximum gamma in the Clayden desensitized areas greater than two and in the higher sensitivity areas greater than four.

3. A material according to claim 1 in which the emulsion layer contains a relatively low concentration of silver halide, gelatin, and an acrylate resin dispersion which coagulates and becomes substantially impervious to water solutions when and after the gelatin is washed out.

4. A material according to claim 1 in which the areas of minimum desensitization have substantially no desensitization.

5. A photographic material comprising a support and a uniformly thick photosensitive silver halide emulsion layer on the support with a halftone pattern of undulating sensitivity uniformly distributed throughout the layer with the areas of lower sensitivity Clayden desensitized and the areas of higher sensitivity hypersensitized by exposure.

6. A material according to claim 5 in which the hypersensitized areas are tiny areas each less than 20 per cent of the area of an element of the halftone pattern, exposed more than threshold exposure.

7. A material according to claim 5 in which the desensitized areas and the hypersensitized areas complement one another and form a sensitivity distribution with no areas of appreciable size with uniform sensitivity.

8. A material according to claim 5 in which the hypersensitized areas are center areas between desensitized areas at the corners of square halftone elements and the center areas are hypersensitized by exposure to images substantially in the form of a Maltese cross with the ends of the cross in the middles of the sides of the square.

9. A photographic material comprising a support and a uniformly thick photosensitive silver halide emulsion layer on the support with a halftone pattern of undulating sensitivity uniformly distributed throughout the layer with the areas of lower sensitivity Clayden desensitized and the areas of higher sensitivity hypersensitized by exposure.

10. A material according to claim 9 in which the layer has a maximum gamma in the Clayden desensitized areas greater than two and in the higher sensitivity areas greater than four.

11. A material according to claim 9 in which the emulsion layer contains a relatively low concentration of silver halide with a maximum gamma less than one, gelatin, and an acrylate resin dispersion which coagulates and becomes substantially impervious to water solutions when and after the gelatin is washed out.

12. A material according to claim 9 in which the hypersensitized areas are tiny areas each less than 20 percent of the area of an element of the halftone pattern, exposed more than threshold exposure.

13. A material according to claim 9 in which the desensitized areas and the hypersensitized areas complement one another and form a sensitivity distribution with no areas of appreciable size with uniform sensitivity.

14. A material according to claim 9 in which the hypersensitized areas are center areas between desensitized areas at the corners of square halftone elements and the center areas are hypersensitized by exposure to images substantially in the form of a Maltese cross with the ends of the cross in the middles of the sides of the square.

15. A photographic material comprising a transparent support and a uniformly thick photosensitive silver halide emulsion layer on the support with a maximum gamma greater than four and with a halftone pattern of undulating sensitivity uniformly distributed throughout the layer with the areas of lower sensitivity Clayden desensitized and a maximum gamma greater than two and the areas of higher sensitivity each including a tiny area less than 20 per cent of the area of an element of the halftone pattern exposed more than the threshold exposure.

16. A photographic material comprising a transparent support and a uniformly thick photosensitive silver halide emulsion layer on the support with a maximum gamma greater than four and with a halftone pattern of undulating sensitivity uniformly distributed throughout the layer with the areas of lower sensitivity Clayden desensitized and a maximum gamma greater than two and the areas of higher sensitivity hypersensitized by exposure and the sensitivities in the desensitized and hypersensitized areas being complementary to one another forming a sensitivity distribution with no areas of appreciable size with uniform sensitivity.

17. A photographic material comprising a transparent support and a uniformly thick photosensitive silver halide emulsion layer on the support with a maximum gamma greater than four and with a halftone pattern of undulating sensitivity uniformly distributed throughout the layer with the areas of lower sensitivity Clayden desensitized and a maximum gamma greater than two and the areas of higher sensitivity hypersensitized by exposure to images each in the form of a Maltese cross with the desensitized areas at the corners of square halftone elements and the ends of each Maltese cross in the middles of the sides of the square in each element.

18. The method of making halftone sensitive material which comprises exposing a photosensitive silver halide emulsion through a halftone screen to a high intensity short duration uniform flash of sufficient intensity and sufficiently short duration to produce a Clayden desensitization, the exposure at the emulsion being distributed due to the screen in an undulating halftone pattern.

19. The method according to claim 18 in which said emulsion has a maximum gamma greater than four before exposure.

20. The method of making a halftone sensitive material with a halftone pattern of elements whose centers are hypersensitized and whose corners are desensitized which comprises twice exposing a photosensitive silver halide emulsion layer through a sharp halftone screen spaced from the layer to provide an undulating distribution of exposure at the layer, the exposure of the corners being a high intensity short duration flash of sufficient intensity and sufficiently short duration to Clayden desensitize the corners and the exposure of the centers being a lower intensity, longer duration exposure of sufficient intensity and duration to hypersensitize the centers.

21. The method according to claim 20 in which the exposure of each center is substantially confined to a tiny dot less than 20 per cent of the area of the element and is of sufficient intensity and duration to exceed threshold exposure.

22. The method according to claim 20 in which the desensitizing exposure of the corners and the hypersensitizing exposure of the centers are complementary to each other so that in the distribution of sensitivities there are no areas of appreciable size with uniform sensitivity.

23. The method according to claim 20 in which the halftone pattern consists of square elements with desensitized corners and the hypersensitizing exposure of each center is to an image substantially of Maltese cross shape with the ends of the cross in middles of the sides of each square element.

References Cited in the file of this patent

UNITED STATES PATENTS

| Number | Name | Date |
|---|---|---|
| 2,102,021 | Murray | Dec. 14, 1937 |
| 2,500,052 | Yackel | Mar. 7, 1950 |

FOREIGN PATENTS

| Number | Country | Date |
|---|---|---|
| 250,770 | Great Britain | Apr. 22, 1926 |
| 937,885 | France | Mar. 22, 1948 |